3,463,797
SUBSTITUTED - 17α - BUTA - 1',3'-DIYNYL-17β-HYDROXY(17β-ALKOXY)-STEROIDS AND PROCESS FOR PREPARATION THEREOF

Peter Feather and Vladimir Petrow, London, England, assignors to The British Drug House Limited
No Drawing. Filed Jan. 27, 1967, Ser. No. 612,081
Claims priority, application Great Britain, Feb. 3, 1966, 4,766/66
Int. Cl. C07c 169/08, 169/20; A61k 17/00
U.S. Cl. 260—397.4                           22 Claims

ABSTRACT OF THE DISCLOSURE

17α - buta - 1',3' - diynyl - 17β - hydroxy (17β-alkoxy)-steroids in which the terminal hydrogen atom of the butadiynyl group has been replaced by an alkyl, hydroxyalkyl, alkenyl, alkynyl or aryl group are prepared by treating an ethynyl compound R″—C≡CH with a cuprous salt and a bromoethynyl compound R‴—C≡CBr where one of R″ and R‴ represents a steroidal moiety with the ethynyl or bromoethynyl group attached at C–17 and the other of R″ and R‴ represents the alkyl, hydroxyalkyl, alkenyl, alkynyl or aryl group

---

This invention is for improvements in or relating to organic compounds and has particular reference to 17α-buta-1',3' - diynyl - 17β - hydroxy(17β - alkoxy) - steroids in which the terminal hydrogen atom of the butadiynyl group has been replaced by an alkyl, hydroxyalkyl, alkenyl, alkynyl or aryl group, and to a process for their preparation.

In our copending application Ser. No. 559,731 filed June 23, 1966 is described a process for the preparation of the hitherto unreported 17α - alka - 1',3' - diynyl - 17β - hydroxy(17β-alkoxy)-steroids, which process comprises the direct alkylation of the corresponding 17α-buta-1',3'-diynyl steroids, and in our copending application Ser. No. 576,866 filed Sept. 2, 1966 is described an improved process for the preparation of 17α-alka-1',3'-diynyl-17β-hydroxy(17β-alkoxy)-steroids which process comprises reacting the corresponding 17-oxo-steroids with a metallic derivative of the appropriate alka-1,3-diyne.

17α - alka - 1',3' - diynyl - 17β - hydroxy(17β - alkoxy)-steroids and the compounds of the present invention are of value in the art on account of their potent hormonal and anti-hormonal properties, including oestrogenic, progestational, claudogenic, ovulation-inhibiting and gonadotrophin-inhibiting properties. Additionally, some of them will have an effect upon cervical mucus. Thus, the compounds are of value in preparations for the treatment of a wide range of conditions and defects of the reproductive system and for the limitation or enhancement of fertility both in the veterinary and human fields. Some of the compounds may have lipotrophic properties, or effects on the reticulo-endothelial system, rendering them of value in such fields, for example, as the treatment of circulatory disorders and the enhancement of resistance to infection. The compounds may be administered in the forms of tablets, pills, injections, vaginal tampons and other standard pharmaceutical and veterinary preparations.

It is an object of the present invention to provide certain new substituted - 17α - buta - 1',3' - diynyl - 17β - hydroxy(17β-alkoxy)-steroids having the partial Formula I below where R′ is H or an alkyl group containing not more than 5 carbon atoms; and R is an alkyl, hydroxyalkyl or alkenyl group containing not more than 5 carbon atoms, or an alkynyl group containing not more than 7 carbon atoms, or an aryl group containing not more than 9 carbon atoms.

The invention provides 17α - hydroxyalkyl-, 17α-alkenyl-, 17α-alkynyl- and 17α-aryl-buta-1',3'-diynyl-17β-hydroxy(17β-alkoxy)-steroids having the partial formula

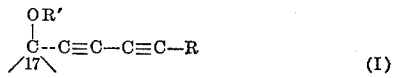
(I)

where R′ is H or an alkyl group containing not more than 5 carbon atoms and R is a hydroxyalkyl or alkenyl group containing not more than 5 carbon atoms or an alkynyl group containing not more than 7 carbon atoms or a aryl group cotaining not more than 9 carbon atoms.

The invention also provides the following specific substituted - 17α - buta - 1',3' - diynyl - 17β - hydroxy(17β-alkoxy)-steroids:

17α-(5'-hydroxy-penta-1',3'-diynyl)-3,17β-dimethoxy-oestra-1,3,5(10)-triene
17α-(4'phenyl-buta-1',3'-diynyl)-3,17β-dimethoxy-oestra-1,3,5(10)-triene which has oestrogenic activity in the mouse
17α-hex-5'-en-1',3'-diynyl-3-methoxy-oestra-1,3,5,(10)-trien-17β-ol which has claudogenic activity in rats
17α-n-octa-1',3'-diynyl-androst-5-en-3,17β-diol
17α-octa-1',3',5'-triynyl-3,17β-dimethoxy-oestra-1,3,5(10)-triene which has claudogenic activity in rats
17α-hepta-1',3',5'-triynyl-3-methoxy-oestra-1,3,5(10)-trien-17β-ol which has oestrogenic activity in the mouse
17α-octa-1',3',diynyl-oestra-1,3,5(10)-triene-3,17β-diol
17β-hydroxy-6α-methyl-17α-octa-1',3'-diynyl-androst-4-en-3-one
3-diethylaminoethoxy-17α-octa-1',3'-diynyl-oestra-1,3,5(10)-trien-17β-ol
Rac-17α-(hexa-1',3'-diynyl)-3-methoxy-18-methyloestra-1,3,5(10)-trien-17β-ol
17α-phenylbutadiynyl-androst-5-ene-3β,17β-diol.

According to the present invention there is provided a new process for the preparation of substituted 17α-buta-1',3'-diynyl-17β-hydroxy(17β-alkoxy)-steroids having the partial formula

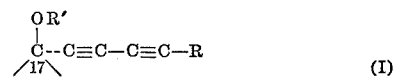
(I)

where R′ is H or an alkyl group containing not more than 5 carbon atoms; and R is an alkyl, hydroxyalkyl or alkenyl group containing not more than 5 carbon ators, or an alkynyl group containing not more than 7 carbon atoms, or an aryl group containing not more than 9 carbon atoms, which process comprises treating an ethylnyl compound R″—C≡SH with a cuprous salt and a bromoethynyl compound R‴—C≡CBr where one of R″ and R‴ represents a steroidal moiety with the ethynyl or bromoethynyl group attached at $C_{17}$ and the other of R″ and R‴ represents an alkyl, hydroxyalkyl or alkenyl group containing not more than 5 carbon atoms, or an alkynyl group containing not more than 7 carbon atoms, or an aryl group containing not more than 9 carbon atoms.

The cuprous salt is preferably cuprous chloride. The reaction which results in the formation of the required buta-1',3'-diynyl chain may be represented as follows:

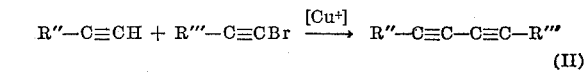
(II)

where R″ and R‴ have the same meaning as above.

Advantageously, the process of the invention may be carried out employing a catalytic quantity of cuprous chloride. Of the two reagents R″—C≡CH and $$R'''\!-\!C\!\equiv\!CBr$$

the non-steroidal reagent is preferably present in a small or moderate excess. It is desirable to carry out the reaction in the presence of a base, such as ethylamine, to take up hydrogen halide and of a reducing agent, preferably a salt of hydroxylamine, to maintain the copper in the cuprous state. The process of the invention may be carried out under an inert atmosphere at temperatures between $-10°$ C. and $40°$ C. or higher, or advantageously at $0°$ C. or room temperature. The reaction generally takes place rapidly but times up to 2 hours are conveniently allowed to ensure completion. A wide range of organic solvents is suitable for the reaction providing that the cuprous salt of the ethynyl compound $$(R''\!-\!C\!\equiv\!CH)$$

is adequately soluble, but polar solvents, and especially mixtures consisting of an alcohol and N,N-dimethyl-formamide containing some water, are preferred. When reaction is complete, a reagent, for example potassium cyanide, may be added to destroy any residual acetylenic cuprous compound, and the steroidal product may be recovered according to the usual procedures of the art, for example by diluting the mixture with water and filtering or extracting with a solvent such as ether, with subsequent purification by chromatography and/or crystallisation from a suitable solvent.

With a suitable choice of reaction conditions, the required substituted-$17\alpha$ - buta-$1',3'$-diynyl-$17\beta$-hydroxy ($17\beta$-alkoxy)-steroid is obtained in favorable yield. The process of the invention is rapid, simple to perform, and avoids handling some of the hazardous reagents required by our earlier processes, such as liquid ammonia, alka-1,3-diynes, 1,4-dichloro-but-2-yne (a powerful vesicant) and its homologues. Numerous ethynyl and bromoethynyl components are readily available or may conveniently be prepared by well-konwn procedures, so that the process of the invention is particularly suitable for the preparation of a wide range of substituted-$17\alpha$-buta-$1',3'$-diynyl-steroids.

It will be apparent to those skilled in the art that the process of the invention may be applied to steroids containing the wide variety of standard steroidal substituents and unsaturated linkages in Rings A, B, C and D.

It is, in general, desirable to protect carbonyl groups, and in particular carbonyl groups at $C_1$, $C_2$, $C_3$, $C_4$, $C_6$ and $C_{12}$ from attack during the course of the reaction. Such protection may be achieved, for example, by prior conversion into a ketal, thioketal, enamine or enol ether, and subsequent regeneration. However, it may be found in practice that negligible attack on the carbonyl group occurs in the short time required for the process of the invention and a satisfactory product may be obtained without protecting the carbonyl group.

Hydroxy groups and in particular hydroxy groups at $C_1$, $C_2$, $C_3$, $C_4$, $C_5$, $C_6$, $C_7$, $C_9$, $C_{11}$, $C_{12}$, $C_{14}$, $C_{15}$, $C_{16}$ and $C_{17}$ are not disadvantageous and may in certain cases, particularly in instances in which the ethynyl group involved in the process of the invention is attached to the steroidal nucleus, lead to an increased yield of the desired product.

Alkoxy groups, including diaminoalkoxy groups, at such positions as $C_3$, $C_6$, $C_7$ and $C_{17}$ do not impede the process of the invention and do not suffer attack.

Alkyl and alkenyl groups containing up to 3 carbon atoms and in particular methyl or methylene groups at $C_1$, $C_2$, $C_3$, $C_4$, $C_6$, $C_7$ and $C_{16}$ do not, in general, interfere with the process of the invention.

Unsaturated linkages, and in particular such linkages at $\Delta_1$, $\Delta_2$, $\Delta_3$, $\Delta_4$, $\Delta_5$, $\Delta_{5(10)}$, $\Delta_6$, $\Delta_7$, $\Delta_8$, $\Delta_{8(14)}$, $\Delta_9$, $\Delta_{9(11)}$, $\Delta_{11}$ and $\Delta_{14}$ and combination of such unsaturated linkages including aromatic Rings A and/or B do not, in general, interfere with the process of the invention.

New steroids provided by the present invention may belong to the androstane, 19-norandrostane, oestrane, 18-methyl-oestrane, 18-ethyloestrane, oestratriene, 18-methyl-oestratriene or 18-ethyl-oestratriene series or stereoisomers thereof and may optionally contain unsaturated linkages at $\Delta_1$, $\Delta_2$, $\Delta_3$, $\Delta_4$, $\Delta_5$, $\Delta_{5(10)}$, $\Delta_6$, $\Delta_7$, $\Delta_8$, $\Delta_9$, $\Delta_{9(11)}$, $\Delta_{11}$ or $\Delta_{14}$, or combinations of two or more such unsaturated linkages including aromatic Rings A and/or B: hydroxy groups at $C_1$, $C_2$, $C_3$, $C_4$, $C_5$, $C_6$, $C_7$, $C_{11}$, $C_{16}$ and $C_{17}$ or derived acyloxy groups containing not more than 5 carbons atoms, or combinations of two or more such groups: 3-dialkylaminoalkoxy groups in which the alkyl groups may contain up to 5 carbon atoms; alkoxy groups containing not more than 5 carbon atoms at $C_3$, $C_{17}$; alkyl or alkenyl groups containing up to 3 carbon atoms at $C_1$, $C_2$, $C_4$, $C_6$, $C_7$ or $C_{16}$, or combinations of two or more such groups; carbonyl groups at $C_2$, $C_3$, $C_6$, $C_{11}$ or $C_{12}$, or combinations of two or more such groups.

It will be understood that the process of the invention may be carried out with any $17\alpha$-ethynyl or $17\alpha$-bromoethynyl steroid compounds having any known combination of substituents and unsaturated positions as set forth above.

Following is a description by way of example of methods of carrying the invention into effect.

EXAMPLE 1

$17\alpha$-penta-$1',3'$-diynyl-3-methoxy-oestra-1,3,5(10)-trien-$17\beta$-ol

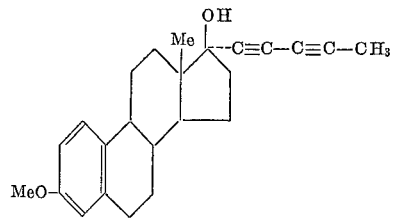

Propyne (3 g.) in N,N-dimethyl-formamide (25 ml.) was added to a stirred mixture of cuprous chloride (0.2 g.), hydroxylamine hydrochloride (0.36 g.), methanol (25 ml.), N,N-dimethyl-formamide (40 ml.) and aqueous ethylamine (5.2 ml.; 70%), under nitrogen, followed, after 5 minutes by $17\alpha$-bromoethynyl-3-methoxy-oestra-1,3,5(10)-trien-$17\beta$-ol (2.0 g.) in N,N-dimethyl-formamide (20 ml.). The mixture was stirred for 1½ hours at room temperature, treated with potassium cyanide (0.4 g.) in water (5 ml.) and poured into water. The precipitate was collected and stirred with methanol, the portion insoluble in methanol being rejected. The residue from evaporation of the methanol was purified by chromatography on alumina (50 g.), eluting with toluene, which afforded $17\alpha$-penta-$1',3'$-diynyl - 3 - methoxy-oestra-1,3,5 (10)-trien-$17\beta$-ol, $[\alpha]_D^{29}-$ $50°$ (c. 0.998 in dioxan); $\lambda_{max.}^{EtOH}$ 279 m$\mu$ ($\epsilon$, 2030), 287 m$\mu$ ($\epsilon$, 1940); $\nu_{max.}^{CCl_4}$ 3607, 2240, 1609, 1592 cm.$^{-1}$; $\nu_{max.}^{CS_2}$ 1253, 1043 cm.$^{-1}$

EXAMPLE 2

$17\alpha$-penta-$1',3'$-diynyl-3,$17\beta$-dimethoxy-oestra-1,3,5(10)-triene

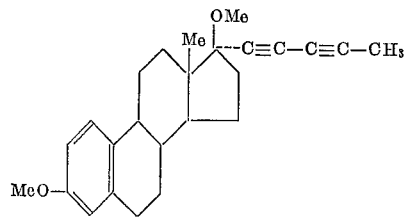

Propyne (0.2 g.) in N,N-dimethylformamide (10 ml.) was added to a stirred mixture of cuprous chloride (0.05 g.), hydroxylamine hydrochloride (0.09 g.), N,N-dimethylformamide (10 ml.), methanol (6.5 ml.) and aqueous ethylamine (1.3 ml.: 70%) at $0°$ C. under nitrogen, followed, after 3 minutes by $17\alpha$-bromoethynyl-3,$17\beta$- dimethoxy-oestra-1,3,5(10)-triene (0.9 g.) in N,N-dimethyl-formamide (10 ml.). The mixture was stirred for 2 minutes at 0° C. treated with potassium cyanide (0.1 g.) in water (10 ml.) and diluted with water (20 ml.). The precipitate was collected and purified by thin-layer chromatography on silica gel impregnated with silver nitrate, eluting with toluene and by crystallisation from aqueous methanol, affording 17α-penta-1',3'-diynyl-3,17β-dimethoxy-oestra - 1,3,5(10) - triene, M.P. 112.5° C., $[\alpha]_D^{24}$—62° (c. 0.24 in doxan), $\lambda_{max.}^{EtOH}$ 220 m$\mu$ ($\epsilon$, 8850), 278 m$\mu$ ($\epsilon$, 2040), 286 m$\mu$ ($\epsilon$, 1910), $\nu_{max.}^{Nujol}$ 2283 cm.$^{-1}$

EXAMPLE 3

17α-(5'-hydroxy-penta-1',3'-diynyl)-3,17β-dimethoxy-oestra-1,3,5(10)-triene

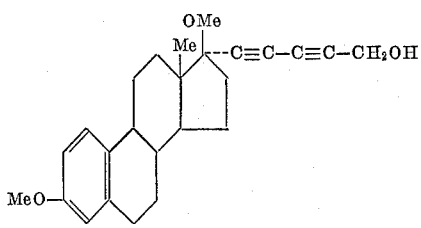

Propargyl alcohol (0.5 g.) was added to a stirred mixture of cuprous chloride (0.05 g.), hydroxylamine hydrochloride (0.09 g.), methanol (6.5 ml.), N,N-dimethyl-formamide (10 ml.) and aqueous ethylamine (1.3 ml.: 70%), under nitrogen at 0° C. followed, after 2 minutes by 17α-bromoethynyl-3,17β-dimethoxy-oestra-1,3,5(10)-triene (1.0 g.) in N,N-dimethyl-formamide (10 ml.). The mixture was stirred for 2 minutes at 0° C., treated with potassium cyanide (0.1 g.) in water (10 ml.) and diluted with water (20 ml.). The precipitate was collected and purified by thin-layer chromatography on silica gel impregnated with silver nitrate, eluting with toluene/ethyl acetate, and afforded 17α-(5'-hydroxy-penta-1',3'-diynyl)-3,17β-dimethoxy-oestra - 1,3,5(10) - triene, $\lambda_{max.}$ 278M$\mu$ ($\epsilon$, 2020), 287 m$\mu$ ($\epsilon$, 1940);

$\nu_{max.}^{CCl_4}$ 3596, 2240, 1608 cm.$^{-1}$; $\nu_{max.}^{CS_2}$ 1255, 1237, 1091, 042 cm.$^{-1}$ The compound had oestrogenic and claudogenic properties.

EXAMPLE 4

17α-(4'-phenyl-buta-1',3'-diynyl)-3,17β-dimethoxy-oestra-1,3,5(10)-triene

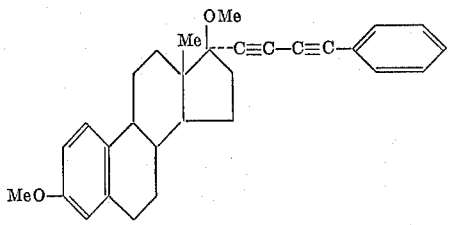

(A) Phenyl-acetylene (0.5 g.) (T. H. Vaughn, R. R. Vogt and J. A. Nieuwland, J. Am. Chem. Soc., 1934, 56, 2121) was added to a stirred mixture of cuprous chloride (0.05 g.), hydroxylamine hydrochloride (0.09 g.), methanol (6.5 ml.), N,N-dimethyl-formamide (10 ml.) and aqueous ethylamine (1.3 ml.: 70%), under nitrogen at 0° C., followed after 2 minutes by 17α-bromoethynyl-3,17β-dimethoxy-oestra-1,3,5(10)-triene (1.0 g.) in N,N-dimethyl-formamide (10 ml.). The mixture was stirred for 2 minutes at 0° C., treated with potassium cyanide (0.1 g.) in water (10 ml.) and diluted with water (20 ml.). The precipitate was collected and purified by thin-layer chromatography on silica gel impregnated with silver nitrate, eluting with toluene and by crystallisation from aqueous methanol, affording 17α-(4'-phenyl-buta-1',3'-diynyl)-3,17β-dimethoxy-oestra - 1,3,5(10) - triene, M.P. 106° C., $[\alpha]_D^{26}$—80° (c. 0.87 in dioxan);

$\lambda_{max.}^{EtOH}$ 225 m$\mu$ ($\epsilon$, 64500), 246 m$\mu$ ($\epsilon$, 8920), 259 m$\mu$ ($\epsilon$, 20200), 274 m$\mu$ ($\epsilon$, 33100), 290 m$\mu$ ($\epsilon$, 26700); $\lambda_{inf.}^{EtOH}$ 221.5 m$\mu$ ($\epsilon$, 43300), 303 m$\mu$ ($\epsilon$, 2400

(B) 3,17β-dimethoxy - 17α - ethynyl-oestra-1,3,5(10)-triene (German Patent 1,062,698) (1.0 g.) in N,N-dimethyl-formamide (10 ml.) was added to a stirred mixture of cuprous chloride (0.20 g.), hydroxylamine hydrochloride (0.36 g.), methanol (26 ml.), N,N-dimethyl-formamide (40 ml.) and aqueous ethylamine (5.2 ml.: 70%), under nitrogen at 0° C., followed, after 15 minutes by 1-bromo-2-phenyl-acetylene (8 g.) (F. Straus, L. Kollek and W. Heyn, Ber., 1930, 63, 1868). The mixture was stirred at 0° C. for 30 minutes, treated with potassium cyanide (0.4 g.) in water (40 ml.) and diluted with water to precipitate the product. The solid was collected and purified by thin-layer chromatography on silica gel impregnated with silver nitrate, eluting with toluene, and by crystallisation from aqueous methanol, affording 17α-(4'-phenyl-buta-1',3'-diynyl) - 3,17β - dimethoxy-oestra-1,3,5(10)-triene identical with the product reported in (A) above.

EXAMPLE 5

17α-hex-5'-en-1',3'-diynyl-3-methoxy-oestra-1,3,5(10)-trien-17β-ol

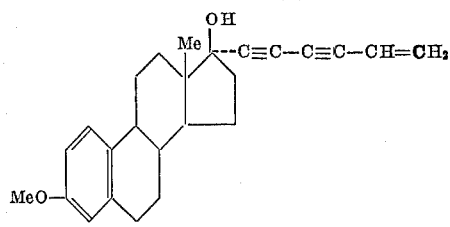

Vinyl-acetylene (0.5 g.) in N,N-dimethyl-formamide (10 ml.) was added to a stirred mixture of cuprous chloride (0.10 g.), hydroxylamine hydrochloride (0.18 g.), methanol (13 ml.), N,N-dimethyl-formamide (20 ml.) and aqueous ethylamine (2.6 ml.: 70%), under nitrogen at 0° C. followed, after 2 minutes, by 17α-bromoethynyl-3-methoxy-oestra-1,3,5(10)-trien-17β-ol (2.0 g.) in N,N-dimethyl-formamide (20 ml.). The mixture was stirred at 0° C. for 5 minutes, treated with potassium cyanide (0.2 g.) in water (20 ml.) and diluted with water (50 ml.). The steroidal product was recovered by extraction with ether. The etheral solution was dried ($Na_2SO_4$) and evaporated at reduced pressure, and the residue, purified by thin-layer chromatography on silica gel impregnated with silver nitrate, eluting with toluene/ethyl acetate, afforded 17α-hex-5'-en-1',3'-diynyl - 3 - methoxy - oestra-1,3,5(10)-trien-17β-ol, $\nu_{max.}^{CCl_4}$ 3626, 2207, 1610, cm.$^{-1}$; $\nu_{max.}^{CS_2}$ 1255, 1236, 1042 cm.$^{-1}$; $\lambda_{max.}^{EtOH}$ 252 m$\mu$ ($\epsilon$, 7820), 267 m$\mu$ ($\epsilon$, 12300), 283 m$\mu$ ($\epsilon$, 10300)

The compound had oestrogenic and claudogenic properties.

EXAMPLE 6

17α-n-octa-1',3'-diynyl-androst-5-en-3,17β-diol

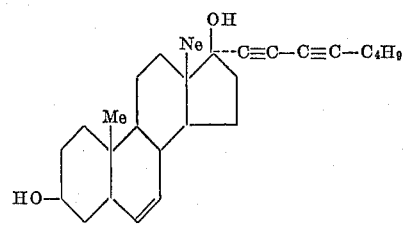

17α-ethynyl-androst-5-en-3,17β-diol (2.0 g.) in N,N-dimethyl-formamide (30 ml.) was added to a stirred mixture of cuprous chloride (0.20 g.), hydroxylamine hydrochloride (0.36 g.), methanol (13 ml.), N,N-dimethyl-formamide (20 ml.) and aqueous ethylamine (2.6 ml.: 70%) under nitrogen at room temperature, followed, after 15 minutes by 1-bromo-n-hex-1-yne (1.98 g.) in N,N-dimethyl-formamide (10 ml.). The mixture became blue and further hydroxylamine hydrochloride (1 g.) was added to decolourise it. The mixture was stirred at room temperature for 1¾ hours, treated with potassium cyanide (0.2 g.) in water (15 ml.) and poured into water (1 litre). The precipitate was collected and purified by thin-layer chromatography on silica gel impregnated with silver nitrate, eluting with ethyl acetate, affording 17α-n-octa-1′,3′-diynyl-androst-5-en-3,17β-diol, M.P. 181° C., $[\alpha]_D^{26}$ —144.5° (c. 0.89 in dioxan);

$\lambda_{max.}^{EtOH}$ 230 mμ (ε, 348), 242 mμ (ε, 354), 256 mμ (ε, 213)

EXAMPLE 7

17α-n-octa-1′,3′-diynyl-3-methoxy-oestra-1,3,5(10)-trien-17β-ol

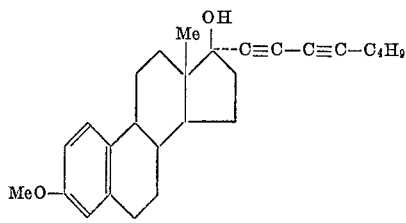

17α-ethynyl-3-methoxy-oestra-1,3,5(10)-trien - 17β - ol (1.0 g.) in N,N-dimethyl-formamide (15 ml.) was added to a stirred mixture of cuprous chloride (0.05 g.), hydroxylamine hydrochloride (0.09 g.), methanol (6.5 ml.), N,N-dimethyl-formamide (10 ml.) and aqueous ethylamine (1.3 ml.: 70%) under nitrogen at room temperature, followed, after 3 minutes by 1-bromo-n-hex-1-yne (1.0 g.) in N,N-dimethyl-formamide (5 ml.). The mixture was stirred at room temperature for 2 minutes, treated with potassium cyanide (0.1 g.) in water (10 ml.), and poured into water (200 ml.). The precipitate was collected and stirred with methanol, the insoluble portion being rejected. The residue from evaporation of the methanol was purified by thin-layer chromatography on silica gel, eluting with toluene/ethyl acetate and by crystallisation from hexane, affording 17α-n-octa-1′,3′-diynyl-3-methoxy-oestra-1,3,5(10)-trien-17β-ol, M.P. 74.5° C., $[\alpha]_D^{26}$ —40° (c. 1.1 in CHCl$_3$);

$\lambda_{max.}^{EtOH}$ 278 mμ (ε, 1990), 287 mμ (ε, 1870); $\lambda_{inf.}^{EtOH}$ 259 mμ (ε, 410), 219.5 mμ (ε, 8900)

The compound had high oestrogenic and claudogenic potency.

EXAMPLE 8

17α-hexa-1′,3′-diynyl-3-methoxy-oestra-1,3,5(10)-trien-17β-ol

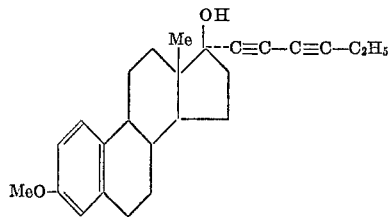

But-1-yne was reacted with 17α-bromoethynyl-3-methoxy-oestra-1,3,5(10)-trien-17β-ol by the method of Example 1, affording 17β-hexa-1′,3′-diynyl - 3 - methoxy-oestra-1,3,5(10)-trien-17α-ol, M.P. 66–69° C., $[\alpha]_D^{30}$ —50° (c. 1.32 in dioxan);

$\lambda_{max.}^{EtOH}$ 278 mμ (ε, 2070), 287 mμ (ε, 1960); $\lambda_{inf.}^{EtOH}$ 219 mμ (ε, 10,000), 258 mμ (ε, 634); $\nu_{max.}^{CCl_4}$ 3600, 2240, 1609, 1947 cm.$^{-1}$; $\nu_{max.}^{CS_2}$ 1256, 1238, 1042 cm.$^{-1}$ The compound had very high oestrogenic and claudogenic acivity.

EXAMPLE 9

17α-hepta-1′,3′-diynyl-3-methoxy-oestra-1,3,5(10)-trien-17β-ol

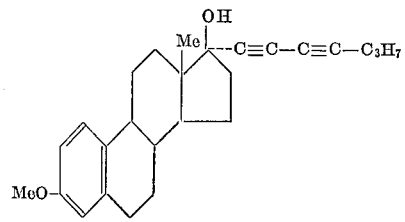

n-Pent-1-yne was reacted with 17α-bromoethynyl-3-methoxy-oestra-1,3,5(10)-trien-17β-ol by the method of Example 1, affording 17α-hepta-1′,3′-diynyl-3-methoxy-oestra-1,3,5(10-trien-17β-ol, M.P. 65.5° C., $[\alpha]_D$ —48.5° (c. 0.67 in dioxan); $\lambda_{max}$ 220 mμ (ε, 8,700), 279 mμ (ε, 1980), 287 mμ (ε, 1890); $\lambda_{inf}$ 259 mμ (ε, 587);

$\nu_{max.}^{CCl_4}$ 3610, 2240, 1610, 1497 cm.$^{-1}$; $\nu_{max.}^{CS_2}$ 1256, 1044 cm.$^{-1}$ The compound had very high oestrogenic and claudogenic activity.

EXAMPLE 10

17α-hexa-1′,3′-diynyl-3,17β-dimethoxy-oestra-1,3,5(10)-triene

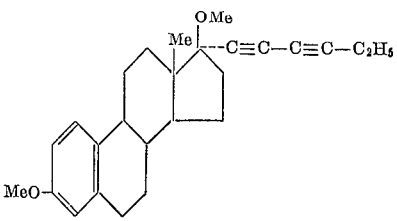

But-1-yne was reacted with 17α-bromoethynyl-3,17β-dimethoxy-oestra-1,3,5(10)-triene by the method of Example 2, affording 17α-hexa-1′,3′-diynyl-3,17β-dimethoxy-oestra-1,3,5(10)-triene, M.P. 80.5° C., $[\alpha]_D^{21}$ —53° (c. 0.22 in dioxan); N.M.R. 6.23τ (17β-OMe), 6.60τ (3-OMe), 9.136τ (18 Me);

$\lambda_{max.}^{EtOH}$ 278 mμ (ε, 2045), 287 mμ (ε, 1925); $\nu_{max.}^{CCl_4}$ 2242, 1609, 1498 cm.$^{-1}$; $\nu_{max.}^{CS_2}$ 1098 cm.$^{-1}$

EXAMPLE 11

17α-n-hepta-1′,3′-diynyl-3,17β-dimethoxy-oestra-1,3,5(10)-triene

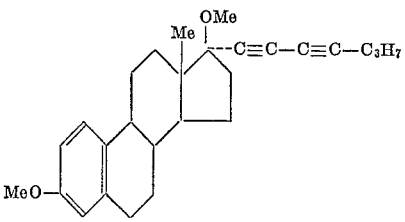

n-Pent-1-yne was reacted with 17α-bromoethynyl-3,17β-dimethoxy-oestra-1,3,5(10)-triene by the method of Example 2, affording 17α-n-hepta-1′,3′-diynyl-3,17β-dimethoxy-oestra-1,3,5(10)-triene, $\lambda_{max.}^{EtOH}$ 278 mμ (ε, 2030), 287 mμ (ε, 1915); $\nu_{max.}^{CCl_4}$ 2243, 1610, 1498 cm.$^{-1}$; $\nu_{max.}^{CS_2}$ 1097 cm.$^{-1}$

EXAMPLE 12

17α-n-octa-1',3'-diynyl-3,17β-dimethoxy-oestra-1,3,5(10)-triene

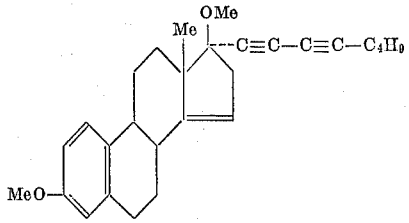

n-Hex-1-yne was reacted with 17α-bromoethynyl-3,17β-dimethoxy-oestra-1,3,5(10)-triene by the method of Example 2, affording 17α-n-octa-1',3'-diynyl-3,17β-dimethoxy-oestra-1,3,5(10)-triene, $\lambda_{max.}^{EtOH}$ 278 mμ (ε, 2025), 286.5 mμ (ε, 1905); $\nu_{max.}^{CCl_4}$ 2245, 1609, 1498 cm.$^{-1}$; $\nu_{max.}^{CS_2}$ 1098 cm.$^{-1}$

EXAMPLE 13

17α-penta-1',3'-diynyl-19-norandrost-4-en-17β-ol-3-one

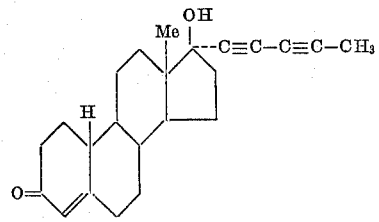

Propyne (3 g.) in N,N-dimethyl-formamide (25 ml.) was added to a stirred mixture of cuprous chloride (0.2 g.), hydroxylamine hydrochloride (0.36 g.), aqueous ethylamine (5.2 ml.: 70%), N,N-dimethylformamide (40 ml.) and methanol (25 ml.), under nitrogen, and the mixture was stirred for a further 5 minutes. 17α-bromoethynyl-3-methoxy-oestra-2,5(10)-dien-17β-ol (2.0 g.) (U.S. Patent 3,072,646) in N,N-dimethyl-formamide (20 ml.) was added and the mixture was stirred for a further 1 hour, and poured into water. The steroidal product was extracted with ether, the ethereal solution was dried over sodium sulphate and the solvent was removed at reduced pressure. The residue, in methanol (75 ml.) was treated with 3 N hydrochloric acid (30 ml.) at 60° C. for 15 minutes. The methanolic solution was poured into water and the steroidal product was extracted with ether. The ethereal solution was washed with sodium bicarbonate solution and with water, dried over sodium sulphate and the solvent was removed at reduced pressure. The residue, purified by chromatography on alumina, eluting with toluene and by crystallisation from ether, afforded 17α-penta-1',3'-diynyl-19-norandrost-4-en-17β-ol-3-one, M.P. 112° C., [α]$_D^{27}$ —94° (c. 1.28 in dioxan);

$\lambda_{max.}^{EtOH}$ 239 mμ (ε, 16151); $\nu_{max.}^{CCl_4}$ 3609, 2242, 1677, 1622 cm.$^{-1}$

EXAMPLE 14

17α-hexa-1',3'-diynyl-19-norandrost-4-en-17β-ol-3-one

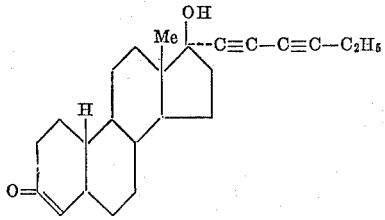

But-1-yne was reacted with 17α-bromoethynyl 3-methoxy-oestra-2,5(10)-dien-17β-ol by the method of Example 13. Purification by chromatography on alumina, eluting with toluene, and by crystallisation from aqueous methanol afforded 17α-hexa-1',3'-diynyl-19-norandrost-4-en-17β-ol-3-one, M.P. 163° C.; [α]$_D^{26}$ —101° (c. 0.6 in dioxan);

$\lambda_{max.}^{EtOH}$ 240 mμ (ε, 17,300), $\nu_{max.}^{CCl_4}$ 3605, 2235, 1679, 1620 cm.$^{-1}$; $\nu_{max.}^{CS_2}$ 1255, 1048 cm.$^{-1}$ The compound had high progestational activity.

EXAMPLE 15

17α-n-hepta-1',3'-diynyl-19-norandrost-4-en-17β-ol-3-one

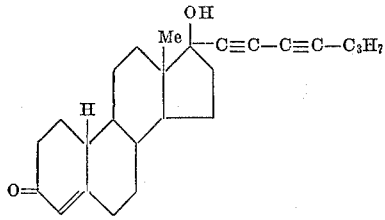

Pent-1-yne was reacted with 17α-bromoethynyl-3-methoxy-oestra-2,5(10)-dien-17β-ol by the method of Example 13. Purification by chromatography on alumina; eluting with toluene, and by crystallisation from methanol/methylene chloride afforded 17α-n-hepta-1',3'-diynyl-19-norandrost-4-en-17β-ol-3-one. M.P. 199.5° C., [α]$_D^{26}$ —95° (c. 1.0 in dioxan);

$\lambda_{max.}^{EtOH}$ 240 mμ (ε, 17,100); $\nu_{max.}^{Nujol}$ 3698, 1677, 1622 cm.$^{-1}$ The compound had high progestational activity.

EXAMPLE 16

17α-n-octa-1',3'-diynyl-19-norandrost-4-en-17β-ol-3-one

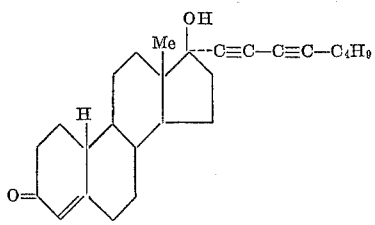

n-Hex-1-yne was reacted with 17α-bromoethynyl-3-methoxy-oestra-2,5(10)-dien-17β-ol by the method of Example 13. Purification by chromatography on alumina, eluting with toluene, and by crystallisation from methanol/methylene chloride afforded 17α-n-octa-1',3'-diynyl-19-norandrost-4-en-17β-ol-3-one, M.P. 228.5° C., [α]$_D^{26}$ —81° (c. 1.2 in CHCl$_3$);

$\lambda_{max.}^{EtOH}$ 239 mμ (ε, 17,000).

EXAMPLE 17

17α-octa-1',3',5'-triynyl-3,17β-dimethoxy-oestra-1,3,5(10)-triene

Hexa-1,3-diyne (4.0 g.) in N,N-dimethyl-formamide (60 ml.) was added to a stirred mixture of cuprous chloride (0.4 g.), hydroxylamine hydrochloride (0.75 g.), methanol (26 ml.), N,N-dimethyl-formamide (40 ml.) and aqueous ethylamine (5.2 ml; 70%) under nitrogen at room temperature. The mixture was stirred for 15 minutes, 17α-bromoethynyl-3,17β-dimethoxy-oestra-1,3,5(10)-triene (4.0 g.) in N,N-dimethyl-formamide (30 ml.) was added, and stirring was continued for a further 1½ hours. Potassium cyanide (0.4 g.) in water (30 ml.) was added, followed by more water (150 ml.). The mixture was extracted with ether, the ethereal solution was washed with water, dried over sodium sulphate and evaporated at reduced pressure. The residue, purified by chromatography on alumina, eluting with petroleum ether (B.P. 60–80° C.), afforded 17α-octa-1′,3′,5′-triynyl-3,17β-dimethoxyoestra-1,3,5(10)-triene, $[\alpha]_D^{26}$ —88° (c. 0.99 in dioxan);

$\lambda_{max.}^{EtOH}$ 207 mμ (ε, 121,000), 216 mμ (ε, 125,000); 279 mμ (ε, 2130), 288 mμ (ε, 2080), 312 mμ (ε, 167); $\nu_{max.}^{Film}$ 2180, 1609, 1574, 1498, 1337, 1256, 1238, 1100, 1049 cm.$^{-1}$

EXAMPLE 18

17α-hepta-1′,3′,5′-triynyl-3-methoxy-oestra-1,3,5(10)-trien-17β-ol

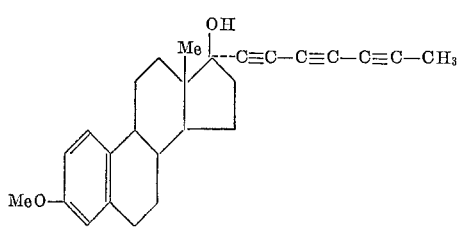

Penta-1,3-diyne and 17α-bromoethynyl-3-methoxy-oestra-1,3,5(10)-trien-17β-ol were reacted by the method of Example 17 and afforded, on purification by chromatography on alumina, eluting with toluene, 17α-hepta-1′,3′,5′-triynyl-3-methoxy-oestra-1,3,5(10)-trien-17β-ol, $\lambda_{max.}^{EtOH}$ 277 mμ (ε, 2240), 286 mμ (2200), 308 mμ (ε, 285); $\nu_{max.}^{CCl_4}$ 3590, 2210 cm.$^{-1}$; $\nu_{max.}^{CS_2}$ 1256, 1236, 1036 cm.$^{-1}$

EXAMPLE 19

17α-octa-1′,3′-diynyl-oestra-1,3,5(10)-triene-3,17β-diol

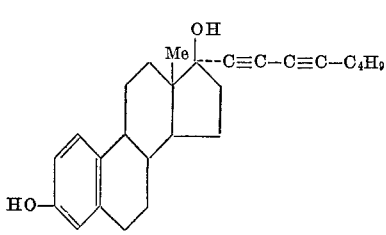

17α-ethynyl-oestra-1,3,5(10)-trien-3,17β-diol (2.80 g.) in N,N-dimethyl-formamide (60 ml.) was added to a stirred mixture of cuprous chloride (0.20 g.), hydroxylamine hydrochloride (0.36 g.), methanol (25 ml.) N,N-dimethyl-formamide (40 ml.) and aqueous ethylamine (5.2 ml.: 70%) under nitrogen at 0° C. After 1 hour 1-bromo-n-hex-1-yne (2.25 g.) in N,N-dimethyl-formamide (20 ml.) was added dropwise during 45 minutes. More hydroxylamine hydrochloride (0.10 g.) was added to discharge a blue coloration which appeared at the end of this time. The mixture was stirred for 1½ hours at room temperature, and treated with potassium cyanide (0.53 g.) in water (6 ml.). More water was added and the steroidal product was isolated by extraction with ether. Purification by crystallisation from ether gave 17α-octa-1′,3′-diylnyl-oestra-1,3,5(10)-trien-3,17β-diol, M.P. 205° C., $[\alpha]_D^{25}$ —61.5° (c. 0.67 in dioxan), λmax. 282 mμ (ε, 2100), $\lambda_{inf.}$ 220 mμ (ε, 7830), 259 mμ (ε, 617), 287 mμ (ε, 1890).

EXAMPLE 20

17β-hydroxy-6α-methyl-17α-octa-1′,3′-diynyl-androst-4-en-3-one

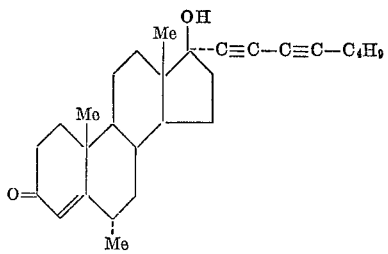

17α-ethynyl-17β-hydroxy-6α-methyl-androst-4-en-3-one Ackroyd, Adams, Ellis, Petrow and Stuart-Webb, J. Chem. Soc., 1957, 4099 (3.07 g.) in N,N-dimethyl-formamide (60 ml.) was added to a stirred mixture of cuprous chloride (0.20 g.), hydroxylamine hydrochloride (0.36 g.), methanol (25 ml.), N,N-dimethyl-formamide (40 ml.) and aqueous ethylamine (5.2 ml. : 70%) under nitrogen at 0° C. After 1½ hours, 1-bromo-n-hex-1-yne (2.25 g.) in N,N-dimethyl-formamide (20 ml.) was added dropwise during 20 minutes. More hydroxylamine hydrochloride (0.36 g.) was added to discharge a blue coloration which appeared towards the end of this time. The mixture was stirred for 1½ hours, at 0° C. and treated with potassium cyanide (0.53 g.) in water (6 ml.). More water was added and the steroidal product was isolated by extraction with ether. Purification by crystallisation from acetone/hexane and ether/hexane gave 17β-hydroxy-6α-methyl-17α-octa-1′,3′-diynyl-androst-4-en-3-one, M.P. 123° C., $[\alpha]_D^{25}$ —26° (c. 0.79 in dioxan), $\nu_{max.}^{CCl_4}$ 3596, 1674, 1609 cm.$^{-1}$

EXAMPLE 21

3-diethylaminoethoxy-17α-octa-1′,3′-diynyl-oestra-1,3,5(10)-trien-17β-ol

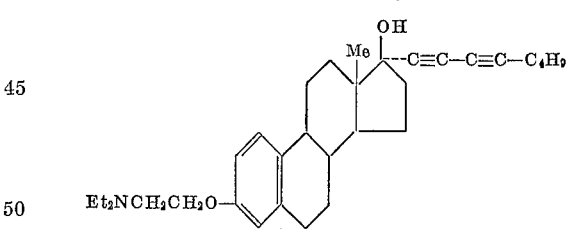

3-diethylaminoethoxy-17α-ethynyl-oestra-1,3,5(10)-trien-17β-ol (2.80 g.) (D. D. Evans, D. E. Evans, G. S. Lewis, P. J. Palmer and D. J. Weyell, J. Pharm. Pharmacol, 1964, 16, 717) in N,N-dimethyl-formamide (40 ml.) was added to a stirred mixture of cuprous chloride (0.14 g.), hydroxylamine hydrochloride (0.24 g.), methanol (17 ml.), N,N-dimethylformamide (30 ml.) and aqueous ethylamine (3.8 ml. : 70%) under nitrogen at 0° C. After 1 hour 1-bromo-n-hex-1-yne (1.75 g.) in N,N-dimethylformamide (20 ml.), was added dropwise, during 45 minutes. More hydroxylamine hydrochloride (0.1 g.) was added to discharge a blue coloration which appeared towards the end of this time. The mixture was stirred for 1½ hours at room temperature. Potassium cyanide (0.5 g.) in water (6 ml.) was added and the mixture was poured into water. The steroidal product was isolated by extraction with ether and treated in anhydrous ether with a saturated ethereal solution of maleic acid. Absolute ethanol was added to redissolve the precipitated oil, and the mixture was allowed to stand at 0° C. The maleic acid salt of 3-diethylaminoethoxy-17α-octa-1′,3′-diynyl-oestra-1,3,5-(10)-trien-17β-ol separated as needles, M.P. 77.5° C., $[\alpha]_D^{25}$ —31° (c. 0.68 in ethanol).

The above salt (0.3 g.), suspended in ether (50 ml.) was shaken at room temperature for 10 minutes with 1 N sodium hydroxide solution (50 ml.). The ether layer was separated, washed with water, dried (Na₂SO₄) and freed from solvent at reduced pressure, affording amorphous 3 - diethylaminoethoxy-17α-octa-1′,3′-diynyl-oestra-1,3,5(10)-trien-17β-ol.

$\nu_{max}^{CCl_4}$ 3595, 2240, 1609 cm.⁻¹

EXAMPLE 22

Rac-17α-(hexa-1′,3′-diynyl)-3-methoxy-18-methyloestra-1,3,5-(10)-trien-17β-ol

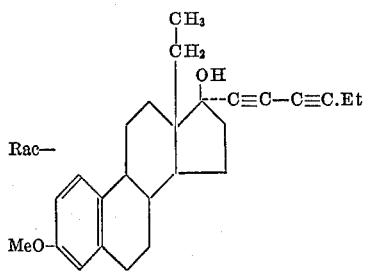

A mixture of cuprous chloride (0.25 g.), hydroxylamine hydrochloride (0.5 g.), dimethylformamide (50 ml.), methanol (31.5 ml.) and 70% aqueous ethylamine (6.5 ml.) was stirred under nitrogen and a solution of rac - 17α - ethynyl-3-methoxy-18-methyloestra-1,3,5(10)-trien-17β-ol (Chem. Pharm. Bull. Japan, 1965, 13, 1293) (3.5 g.) in dimethylformamide (50 ml.) was added. After stirring for 1 hour at room temperature the mixture was cooled in ice and a solution of 1-bromo-but-1-yne (prepared by reaction of but-1-yne with aqueous potassium hypobromite) (2 g.) in dimethylformamide (40 ml.) was added over 1 hour. The mixture was allowed to warm to room temperature over 1.5 hour and a solution of potassium cyanide (0.75 g.) in water (10 ml.) was added. The precipitated material was extracted into ether, the extract was washed with water, dried (Na₂SO₄) and evaporated. The residual gum was purified by preperative thin-layer chromatography on silica gel impregnated with silver nitrate (12 plates, 20 x 40 x 0.1 cm., developed in benzene:ethyl acetate-1:1) and by chromatography on a column of alumina (eluted with ether). Rac-17α-(hexa-1′,3′ - diynyl) - 3 - methoxy-18-methyloestra-1,3,5(10)-trien-17β-ol was obtained as a pale yellow gum having $\lambda_{max.}^{EtOH}$ 278 (ε 2,100) and 286.5 mμ (ε 1,900) and $\nu_{max.}^{CCl_4}$ 3600, 2210, 1610 and 1500 cm.⁻¹

EXAMPLE 23

17α-phenylbutadiynyl-androst-5-ene-3β,17β-diol

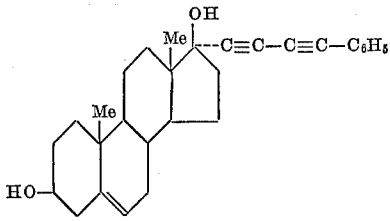

(1) 17α - ethynyl-androst-5-ene-3β,17β-diol (2.00 g.) in N,N-dimethylformamide (60 ml.) was added to a stirred mixture of cuprous chloride (0.40 g.), hydroxylamine hydrochloride (0.72 g.), methanol (52 ml.), N,N-dimethylformamide (80 ml.) and aqueous ethylamine (10.4 ml.: 70%) under nitrogen at room temperature. After 1 hour, bromoethynyl - benzene (Wilson and Wenzke, J. Amer. Chem. Soc., 1934, 56, 2025) (3.3 g.) in N,N-dimethylformamide (5 ml.) was added dropwise and the mixture was stirred for 1 hour at room temperature. Potassium cyanide (0.8 g.) in water (10 ml.) was added, followed by more water (100 ml.). The precipitate was collected and purified by thin-layer chromatography on silica-gel. Elution with toluene-ethyl acetate, and crystallisation of the product from aqueous methanol, gave 17α - phenylbutadiynyl - androst-5-ene-3β,17β-diol, M.P. 253° C., [α]$_D^{29}$ −189° (c. 0.79 in dioxan), λ$_{max.}$ 225 mμ (ε 56346), 234 mμ (ε 3710), 246 mμ (ε 8620), 259 mμ (ε 19860), 274 mμ (ε 31630), 291 mμ (ε 26490).

(2) Lithium (0.51 g.) and ferric nitrate (trace) were added to anhydrous liquid ammonia (1.5 l.) and the mixture was stirred under reflux until the blue colour disappeared. 3β,17β - bis(tetrahydro - 2 - pyranyloxy)-17α-ethynyl-androst-5-ene (14.7 g.) (S. P. Barton, D. Burn, G. Cooley, B. Ellis and V. Petrow, J. Chem. Soc., 1959, 1957) in anhydrous tetrahydrofuran (510 ml.) was added and the mixture was stirred under reflux for 75 minutes. A slow stream of gaseous bromo-trifluoromethane was then passed into the mixture for 2 hours. The ammonia was allowed to evaporate, ammonium chloride and water were added, and the steroidal product was isolated by extraction with ether. It was treated in methanol (1.5 l.) with 4 N hydrochloric acid (10 ml.) for 1 hour at room temperature. The solution was poured into water and the precipitate crystallised from aqueous methanol, affording 17α-bromoethynyl-androst-5-ene-3β,17β-diol, M.P. 209° C., [α]$_D^{25}$ −97° (c. 0.96 in dioxan).

Ethynyl-benzene (3.5 ml.) was added to a stirred mixture of cuprous chloride (0.33 g.), hydroxylamine hydrochloride (0.59 g.), methanol (42 ml.), N,N-dimethylformamide (65 ml.) and aqueous ethylamine (8.5 ml.: 70%), under nitrogen at room temperature. After 10 minutes, the mixture was cooled to 0° C. and 17α-bromoethynyl-androst-5-ene-3β,17β-diol (6.34 g.) in N,N-dimethylformamide (65 ml.) was added dropwise during 20 minutes. The mixture was stirred at room temperature for 1½ hours. Potassium cyanide (0.65 g.) in water (65 ml.) was added, and the mixture poured into water. The precipitate was crystallised from aqueous methanol, affording 17α - phenylbutadiynyl - androst - 5 -ene-3β,17β-diol, identical with the sample prepared as described above.

The steroidal starting material used in Examples 1, 5, 7, 8, 9 and 18 was prepared as follows:

Liquid ammonia (100 ml.) containing lithium (0.07 g.) and a trace of ferric nitrate was stirred under reflux until the blue colour had disappeared. 17β-tetrahydropyranyl ether of 17α-ethynyl-3-methoxyoestra-1,3,5(10)-trien-17β-ol (Cross, Harrison, Kincl, Farkas, Kraay and Dorfman, Steroids, 1964, 4, 429) (1.4 g.) in anhydrous tetrahydrofuran (70 ml.) was added, and the mixture stirred under reflux for 2 hours. Bromotrifluoromethane (20 g.) was slowly passed into the mixture during 3 hours. The ammonia was allowed to evaporate, ammonium chloride (5 g.) was added, followed by water (300 ml.), and the product was isolated with ether. Its solution in ethanol (30 ml.), water (3 ml.) and acetic acid (5 ml.) was refluxed for 4 hours. The product obtained by addition of water and extraction was ether was purified from aqueous methanol to give 17α-bromoethynyl-3-methoxyoestra-1,3,5(10)-trien-17β-ol, M.P. 168–170° C., [α]$_D$ −15° (in dioxan).

The steroidal starting material used in Examples 2, 3, 4, 10, 11, 12 and 17 was prepared as follows:

Liquid ammonia (100 ml.) containing lithium (0.05 g.) and a trace of ferric nitrate was stirred under reflux until the blue colour had disappeared. 17α-ethynyl-3,17β-dimethoxyoestra-1,3,5(10)-triene (German Patent 1,062,-698) (1.0 g.) in anhydrous tetrahydrofuran (50 ml.) was added, and the mixture stirred under reflux for 2½ hours. Bromotrifluoromethane (14 g.) was passed in slowly while the mixture was stirred for a further 2½ hours. The ammonia was allowed to evaporate, ammonium chloride (3 g.) was added, followed by water (200 ml.). The steroidal precipitate was purified from methanol to give 17α - bromoethynyl - 3,17β - dimethoxyoestra-1,3,5(10) - triene, M.P. 131–132° C., [α]$_D$ −34° (in chloroform).

We claim:
1. A process for the preparation of substituted 17α-buta-1',3'-diynyl-17β - hydroxy(17β-alkoxy)-steroids having the partial formula

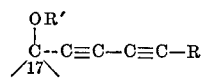

where R' is H or an alkyl group containing not more than 5 carbon atoms, and R is an alkyl, hydroxyalkyl or alkenyl group containing not more than 5 carbon atoms, or an alkylnyl group containing not more than 7 carbon atoms, or an aryl group containing not more than 9 carbon atoms, which process comprises treating an ethynyl compound R''—C≡CH with a cuprous salt and a bromoethynyl compound R'''—C≡CBr where one of R'' and R''' represents a steroidal moiety with the ethynyl or bromoethynyl group attached at $C_{17}$ and the other of R'' and R''' represents an alkyl, hydroxyalkyl or alkenyl group containing not more than 5 carbon atoms, or an alkynyl group containing not more than 7 carbon atoms, or an aryl group containing not more than 9 carbon atoms.

2. A process as claimed in claim 1 wherein a catalytic quantity of cuprous chloride is employed as cuprous salt.

3. A process as claimed in claim 1 wherein of the two reagents R''—C≡CH and R'''—C≡CBr the non-steroidal reagent is present in excess and the reaction is carried out in the presence of a base and of a reducing agent which will maintain the copper in the cuprous state.

4. A process as claimed in claim 3 wherein the base is ethylamine.

5. A process as claimed in claim 3 wherein the reducing agent is a salt of hydroxylamine.

6. A process as claimed in claim 1 wherein the reaction is carried out under an inert atmosphere at temperatures between —10° C. and 40° C.

7. A process as claimed in claim 1 wherein the reaction is carried out in polar organic solvents.

8. A process as claimed in claim 7 wherein the polar organic solvents comprise mixtures consisting of an alcohol and N,N-dimethyl-formamide containing some water.

9. A process as claimed in claim 1 wherein the reaction is completed in up to 2 hours and potassium cyanide is then added to destroy any residual acetylenic cuprous compound.

10. A steroid compound selected from the group consisting of 17α-hydroxyalkyl-, 17α-alkenyl-, 17α-alkynyl- and 17α-aryl-buta-1',3'-diynyl-17β - hydroxy(17β-alkoxy)-steroids of the androstane and oestrane series having at C-17 the structure

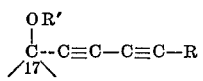

where R' is H or an alkyl group containing not more than 5 carbon atoms and R is a hydroxyalkyl or alkenyl group containing not more than 5 carbon atoms or an alkynyl group containing not more than 7 carbon atoms or an aryl group containing not more than 9 carbon atoms.

11. A compound according to claim 10 consisting of 17α-(5'-hydroxy-penta - 1',3'-diynyl) - 3,17β-dimethoxy-oestra-1,3,5(10)-triene.

12. A compound according to claim 10 consisting of 17α-(4'-phenyl-buta-1',3' - diynyl) - 3,17β - dimethoxy-oestra-1,3,5(10)-triene.

13. A compound according to claim 10 consisting of 17α - hex - 5' - en-1',3'-diynyl-3-methoxyoestra-1,3,5(10)-trien-17β-ol.

14. A compound according to claim 10 consisting of 17α - octa - 1',3',5' - triynyl - 3,17β-dimethoxyoestra-1,3,5(10)-triene.

15. A compound according to claim 10 consisting of 17α-hepta - 1',3',5' - triynyl - 3-methoxy-oestra-1,3,5(10)-trien-17β-ol.

16. A compound according to claim 10 consisting of 17α-phenylbutadiynyl-androst-5-ene-3β,17β-diol.

17. 17α-n-octa-1',3'-diynyl-androst-5-en-3,17β-diol.

18. 17α - octa - 1',3' - diynyl-oestra-1,3,5(10)-triene-3,17β-diol.

19. 17β - hydroxy - 6α - methyl - 17α-octa-1',3'-diynyl-androst-4-en-3-one.

20. 3 - diethylaminoethoxy - 17α - octa - 1',3'-diynyl-oestra-1,3,5(10)-trien-17β-ol.

21. Rac - 17α - (hexa - 1',3'-diynyl)-3-methoxy-18-methyloestra-1,3,5(10)-trien-17β-ol.

22. A compound of the formula:

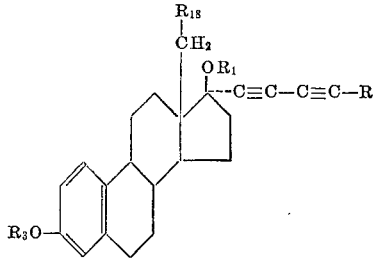

wherein: R is hydroxyalkyl of up to 5 carbon atoms, alkenyl of up to 5 carbon atoms, alkynyl of up to 7 carbon atoms, or aryl of up to 9 carbon atoms; $R_1$ is hydrogen or alkyl of up to 5 carbon atoms; $R_3$ is hydrogen, alkyl of up to 5 carbon atoms, or dialkylaminoalkyl- in which the alkyl groups contain up to 5 carbon atoms; and $R_{18}$ is hydrogen or methyl.

References Cited

UNITED STATES PATENTS 3,164,617   1/1965   Feather et al. _____ 260—397.4

FOREIGN PATENTS 1,108,758   4/1968   Great Britain.

ELBERT L. ROBERTS, Primary Examiner

U.S. Cl. X.R.

260—397.45, 397.5, 999